US011051227B1

(12) United States Patent
Wu et al.

(10) Patent No.: US 11,051,227 B1
(45) Date of Patent: *Jun. 29, 2021

(54) STANAG 4586 COMMUNICATION ENHANCEMENT MODULE

(71) Applicant: Architecture Technology Corporation, Eden Prairie, MN (US)

(72) Inventors: John Wu, Eden Prairie, MN (US); Ranga S. Ramanujan, Medina, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/781,725

(22) Filed: Feb. 4, 2020

Related U.S. Application Data

(63) Continuation of application No. 15/916,000, filed on Mar. 8, 2018, now Pat. No. 10,555,238.

(51) Int. Cl.
| | |
|---|---|
| *H04W 40/12* | (2009.01) |
| *H04W 4/46* | (2018.01) |
| *H04L 29/08* | (2006.01) |
| *H04W 84/18* | (2009.01) |
| *G08G 5/00* | (2006.01) |
| *H04L 12/721* | (2013.01) |
| *H04L 29/06* | (2006.01) |
| *H04W 76/14* | (2018.01) |

(52) U.S. Cl.
CPC ............. *H04W 40/12* (2013.01); *H04L 45/06* (2013.01); *H04L 69/08* (2013.01); *B64C 2201/14* (2013.01); *G08G 5/0069* (2013.01); *H04L 67/12* (2013.01); *H04W 4/46* (2018.02); *H04W 76/14* (2018.02); *H04W 84/18* (2013.01)

(58) Field of Classification Search
CPC ........................................ H04B 7/185–18597
See application file for complete search history.

(56) References Cited

U.S. PATENT DOCUMENTS

| | | |
|---|---|---|
| 2009/0276303 A1 | 11/2009 | Singhal |
| 2010/0293033 A1 | 11/2010 | Hall et al. |

(Continued)

OTHER PUBLICATIONS

"STANAG 4586 (Edition 3)", NATO Standardization Agency, pp. 1-509, Nov. 9, 2012.

(Continued)

*Primary Examiner* — Marcus Smith
(74) *Attorney, Agent, or Firm* — Carlson, Caspers, Vandenburgh & Lindquist, P.A.

(57) ABSTRACT

Embodiments for a method for enhancing communication for operating along with a plurality of cooperating communication enhancement modules are disclosed. The communication enhancement module receives a STANAG 4586 message from an upstream module and determine whether a point-to-point wireless connection is available to the destination. If a point-to-point wireless connection is available, the module sends a message over the point-to-point wireless connection to the destination. If a point-to-point wireless connection is not available, the module identifies a multi-hop path to the destination via at least one other communication enhancement module, modifies the STANAG 4586 message to create a modified message having a format corresponding to the communication enhancement modules, and send the modified message to a next hop communication enhancement module on the multi-hop path for directing toward the destination.

20 Claims, 5 Drawing Sheets

(56) References Cited

U.S. PATENT DOCUMENTS

| | | | |
|---|---|---|---|
| 2011/0245996 A1* | 10/2011 | Orsulak | G05D 1/101 |
| | | | 701/2 |
| 2016/0155339 A1* | 6/2016 | Saad | H04L 69/18 |
| | | | 701/25 |
| 2019/0045348 A1 | 2/2019 | Li et al. | |
| 2019/0103029 A1 | 4/2019 | Hernandez et al. | |
| 2019/0129937 A1 | 5/2019 | Argo | |
| 2019/0223237 A1 | 7/2019 | Hong | |
| 2020/0279078 A1* | 9/2020 | Bevilacqua | G06F 40/30 |

OTHER PUBLICATIONS

Border, et al., "Performance Enhancing Proxies Intended to Mitigate Link-Related Degradations", Network Working Group, pp. 1-45, Jun. 2001, USA.

John W. Nicholson, Autonomous Optimal Rendezvous of Underwater Vehicles, Sep. 2004, Naval Postgraduate School, [retrieved on Dec. 16, 2019]. Retrieved from the Internet URL: (Year: 2004).

U.S. Patent and Trademark Office, "Notice of Allowance", U.S. Appl. No. 15/916,000, dated Sep. 13, 2019, pp. 1-10.

U.S. Patent and Trademark Office, "Notice of Allowance", U.S. Appl. No. 15/926,978, dated Dec. 30, 2019, pp. 1-11.

\* cited by examiner

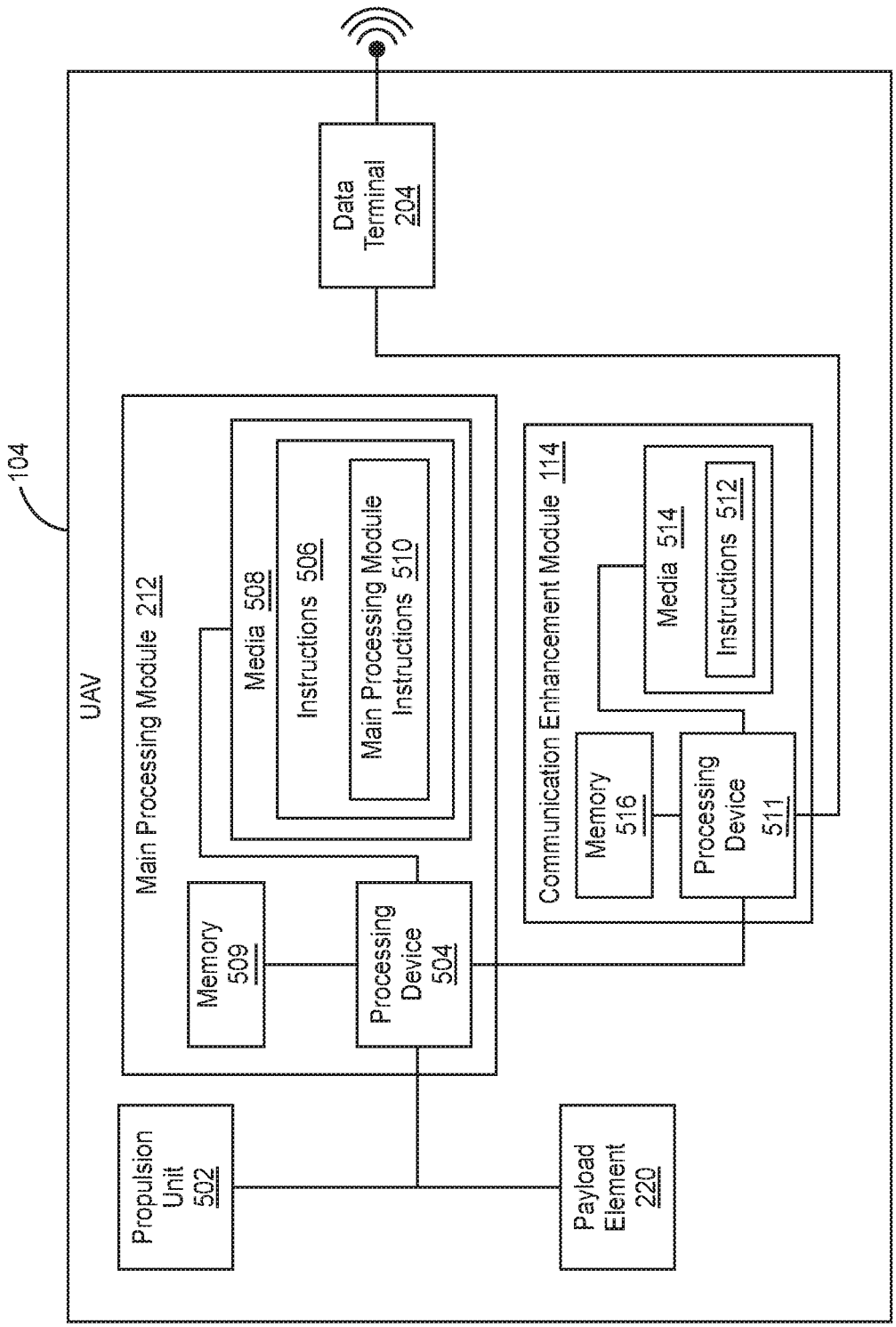

STANAG 4586 COMMUNICATION ENHANCEMENT MODULE

RELATED APPLICATIONS

This application is a continuation of U.S. Pat. No. 10,555,238 filed on Mar. 8, 2018, entitled "UAV COMMUNICATION ENHANCEMENT MODULE", which is hereby incorporated herein by reference.

BACKGROUND

The Unmanned Aerial Vehicle (UAV) communication standard STANAG 4586 allows multiple UAVs to interoperate with a single UAV control system (UCS). Enabling a single UCS to interoperate with multiple UAVs increases command and control efficiency and flexibility in operating UAVs. Because of the interoperability advantages of STANAG 4586, many current and future UAVs are/will be compatible with the standard.

A UCS that is compliant with STANAG 4586 can be referred to as a multi-UAV control system (MUCS). STANAG 4586 provides for communication between a MUCS and a UAV via a point-to-point wireless link between the UAV and the UCS. If multiple UAVs are being controlled by the MUCS, each of the multiple UAVs has a distinct point-to-point wireless link between that UAV and the MUCS. The point-to-point links used with STANAG 4586, however, can suffer from severe bandwidth degradation in certain environments due to weather, geography, and/or enemy jamming. Because of this, there is a need to improve the robustness and reliability of communications for UAVs using the STANAG 4568 standard.

BRIEF DESCRIPTION

Embodiments for a communication enhancement module for a STANAG 4586 system are disclosed.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 5 is a block diagram of an example UAV having a hardware appliance communication enhancement module therein.

DETAILED DESCRIPTION

The subject matter described herein provides for a communication enhancement module that can be added to a plurality of UAVs and to a MUCS to improve the robustness and reliability of UAV communications in the face of degraded bandwidth wireless links. The communication enhancement module exploits the common communication protocol used by STANAG 4586 compliant UAVs and MUCS to interact with the UAVs and MUCS as a bump-in-the wire or bump-in-the-stack module that enhances the communication capabilities of the UAVs and MUCS. The communication enhancement module interacts with its UAV or MUCS using the STANAG 4586 protocol, enabling the communication enhancement module to be added to any new or existing STANAG 4586 compliant UAV or MUCS. Accordingly, the communication enhancement module is configured to be added to a commercial off the shelf (COTS) UAV infrastructure and can provide enhanced communication capabilities thereto.

Figure 1:
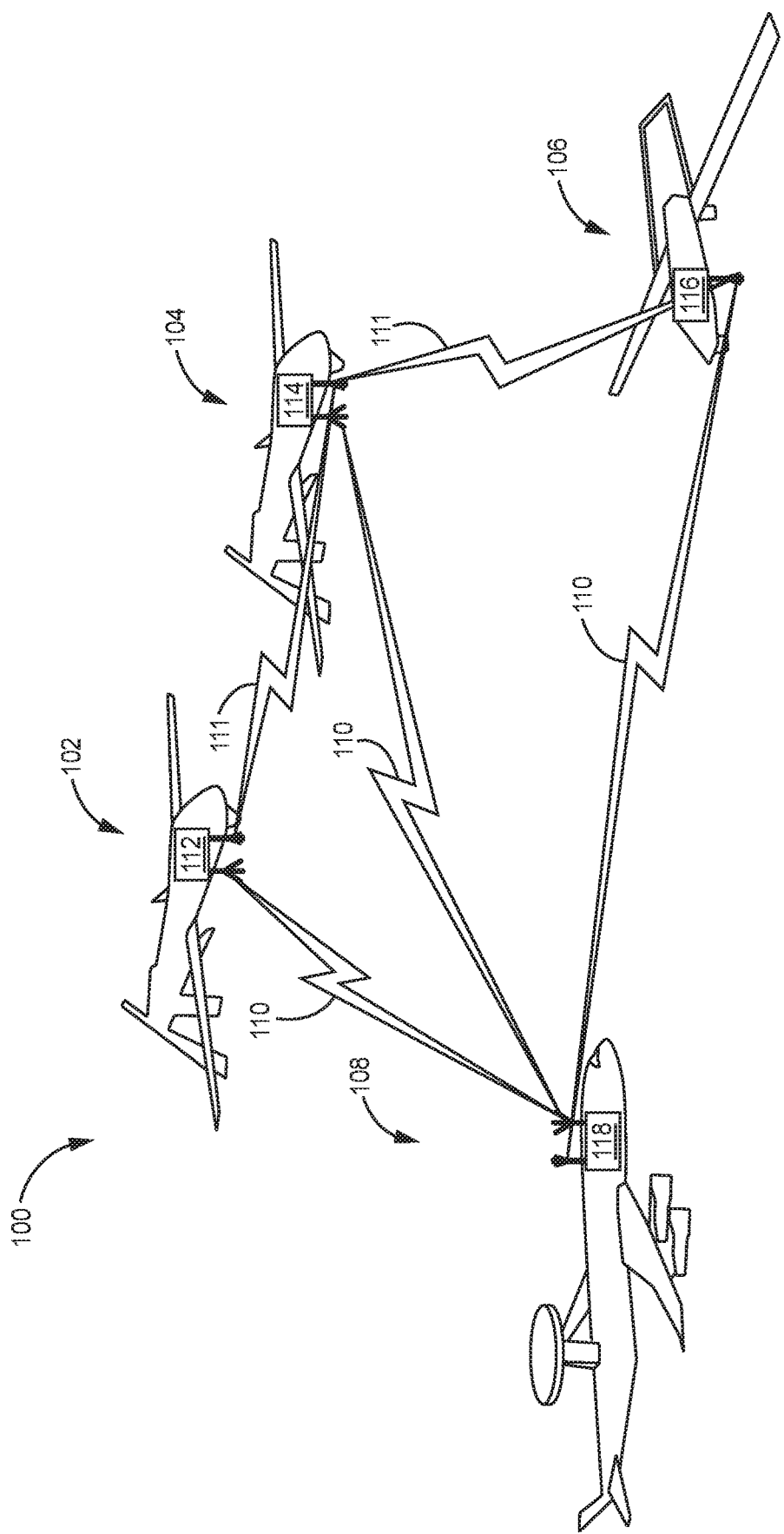
FIG. 1 is a block diagram of an example system including a multi-UAV control system (MUCS) and a plurality of UAVs that have communication enhancement modules therein.

FIG. 1 is a bock diagram of an example system 100 for enhancing communication among a plurality of unmanned aerial vehicles (UAVs) 102-106. System 100 includes a first UAV 102, a second UAV 104, and a third UAV 106, each of which are communicatively coupled to, and controlled by, a multi-UAV control system (MUCS) 108. The MUCS 108 controls the UAVs 102-106 by sending STANAG 4586 messages to the UAVs 102-106. The UAVs 102-106 receive the STANAG 4586 messages and take action as directed by the commands in the STANAG 4586 messages. The UAVs 102-106 can also send STANAG 4586 messages to the MUCS 108 to communicate information back to the MUCS 108. A STANAG 4586 message is a message that conforms to a STANAG 4586 standard, such as edition 3 of the STANAG 4586 standard published on Nov. 9, 2012 by the NATO Standardization Agency, which is hereby incorporated herein by reference. For example, a STANAG 4586 message can be any of the Generic (Common) DLI messages in section 4 of Appendix 1 of Annex B of STANAG 4586.

Each UAV 102-106 and the MUCS 108 includes a respective communication enhancement module 112-118. Each communication enhancement module 112-118 is a software tool or hardware-and-software appliance that interacts with other components of the UAV or MUCS in which the module 112-118 is installed to provide enhanced communication capabilities for the UAV or MUCS.

Each UAV 102-106 can be communicatively coupled to the MUCS 108 via a respective point-to-point wireless link 110 between the respective UAV 102-106 and the MUCS 108 in accordance with the STANAG 4586 standard. In an example, the point-to-point wireless link 110 is a command and control (C2) and/or payload data link for the UAV 102-106. In addition to the point-to-point wireless links 110 with the MUCS 108, the communication enhancement modules 102-106 enable each UAV 102-106 to form a point-to-point wireless link 111 with other UAVs 102-106 that are within communication range. A point-to-point wireless link between two UAVs 102-106 is also referred to herein as a UAV-to-UAV link, and a point-to-point wireless link between a UAV 102-106 and the MUCS 108 is also referred to herein as a UAV-to-MUCS link.

The UAV-to-UAV links 111 enable multi-hop routes between a UAV 102-106 and the MUCS 108, instead of having only UAV-to-MUCS link with the MUCS 108 as supported by the STANAG 4586 standard. The combination of the UAV-to-UAV links 111 and the UAV-to-MUCS links 110 form a network among the UAVs 102-106 and MUCS 108. The network provides a counter to bandwidth degradation in the point-to-point links 110 with the MUCS 108, by enabling a first UAV 102 to communicate with the MUCS 108 via a multi-hop route that uses the point-to-point link 110 between another UAV 104, 106 and the MUCS 108 to communicatively couple the first UAV 102 to the MUCS 108.

Notably, the communication enhancement modules 112-118 enable UAV-to-UAV links 111 to be formed between the UAVs 102-106 while still allowing the UAVs 102-106 to be fully compliant with STANAG 4586, which does not provide for such UAV-to-UAV links 111. The communication enhancement modules 112-118 do so by controlling both ends of the communication links 110, 111 for corresponding UAVs 102-106. To control both ends of the communication links 110, 111, a respective communication enhancement module is provided on each end of each link 110, 111 that is controlled. For example, for the communication link 110 between the MUCS 108 and the first UAV 102, a first communication enhancement module 118 is included in the MUCS 108 for the first end of the communication link 110, and a second communication enhancement module 112 is included in the first UAV 102 for the second end of the link 110. Similarly, for the link 111 between the first UAV 102 and a second UAV 104, the second communication enhancement module 112 is used for the first end of the link 111 and a third communication enhancement module 114 in the second UAV 104 is used for the second end of the link 111. By providing a communication enhancement module 112-118 at each of MUCS 108 and UAVs 102-106, a point-to-point link can be formed between any two of the MUCS/UAVs 102-106.

The communication enhancement modules 112-116 included in their respective UAVs 102-106 can be physically disposed in or on the body of their UAV 102-106, so that the communication enhancement modules 112-116 travel with their UAV 102-106 as it flies around. The MUCS 108 and its corresponding communication enhancement module 118 can be disposed at any appropriate location including on the ground or in an aircraft. In an example, all components of the MUCS 108 can be disposed at a common location or the components of the MUCS 108 can be distributed across multiple locations.

Although three UAVs 102-106 are included the example with reference to FIG. 1, it should be understood that the number of UAVs controlled by a MUCS 108 and in which communication enhancement modules 112-116 are included therein is not limited by the subject matter described herein. Accordingly, fewer or more than three UAVs 102-106 can be included in system 100. Moreover, all of the UAVS controlled by a MUCS 108 can, but need not, include a respective communication enhancement module. Any UAV that does not have a communication enhancement module can still communicate with the MUCS 108 using STANAG 4586 over its UAV-to-MUCS link, but will not have the enhanced communication advantages enabled by the communication enhancement modules. Thus, a set of UAVs controlled by a MUCS 108 can include both UAVs that do include communication enhancement modules and one or more UAVs that do not include a communication enhancement module.

Figure 2:
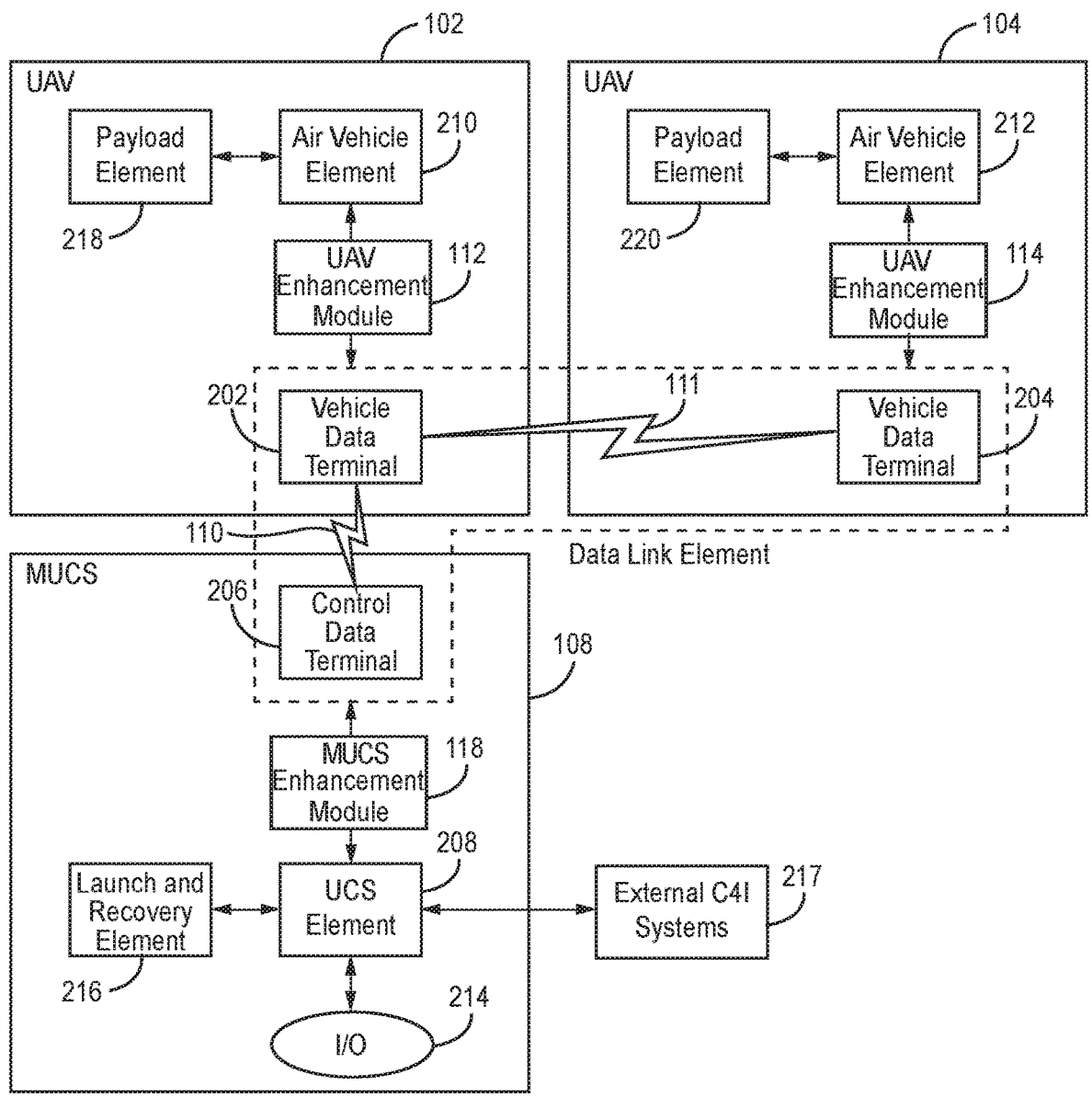
FIG. 2 is a block diagram of a portion of the system of FIG. 1, showing an example MUCS and UAVS having communication enhancement modules therein.

FIG. 2 is a block diagram of a portion of system 100 showing the MUCS 108, a first UAV 102, and a second UAV 104. In the situation shown, a UAV-to-MUCS link 110 is established between the MUCS 108 and the first UAV 102, and a UAV-to-UAV link 111 is established between the first UAV 102 and the second UAV 104. There is no UAV-to-MUCS link established between the second UAV 104 and the MUCS 108. Communications between the MUCS 108 and the first UAV 102 occur over the UAV-to-MUCS link 110. Communications between the MUCS 108 and the second UAV 104 occur over a route including both the UAV-to-MUCS link 110 and the UAV-to-UAV link 111.

Each of the MUCS 108, the first UAV 102, and the second UAV 104 include a respective communication enhancement module 118, 112, 114. The communication enhancement modules 118, 112, 114, coordinate with one another to provide the route between the MUCS 108 and the second UAV 104 via the first UAV 102.

Each of the MUCS 108, the first UAV 102, and the second UAV 104 include one or more data terminals 206, 202, 204 for generating the physical layer for the wireless link(s) 110, 111 of their corresponding device. The data terminal(s) 206, 202, 204 can generate and receive the respective wireless signal to/from their corresponding UAV/MUCS 102, 104, 108. The wireless signal for each communication link 110, 111 can have any suitable physical layer protocol in any suitable frequency range, such as those commonly used with STANAG 4586. Multiple data terminals 202, 204, 206 can be included in a MUCS 108 or UAV 102, 104 for wireless communication over multiple frequencies or communication protocols.

Each UAV/MUCS 102, 104, 108 also includes a main processing module 208, 210, 212 (e.g., air vehicle element, UCS element). The main processing module 208, 210, 212, generates and receives STANAG 4586 messages for communication over the wireless link(s) 110, 111 with the MUCS or UAV 102, 104, 106. The main processing module 208, 210, 212 can also perform general purpose processing for the MUCS/UAV 102, 104, 108. For example, the main processing module 208 in the MUCS 108 can operate a UAV control system for the UAVs 102, 104 and can generate commands to-be-sent to the UAVs 102, 104 to effectuate such controls. The main processing modules 210, 212 in the UAVs 102, 104 can include a vehicle specific module that perform the avionic processing for the UAV and take action in response to commands received from the MUCS 108. Each MUCS/UAV 102, 104, 108 can also include other elements that interact with the main processing modules 208, 210, 212 to perform tasks as desired by the MUCS 108 and the UAVs 102, 104. These other elements can include one or more input/output (I/O) devices 214 at the MUCS 108 for receiving input from and providing output to a user. The I/O device(s) 214 can include any suitable I/O device such as a keyboard, display screen, touchscreen, mouse, touchpad, microphone, etc. The MUCS 108 can also include a launch and recovery element 216 for generating commands for directing the UAVs 102, 104 to launch and be recovered. The main processing module 208 of the MUCS 108 can also send and receive information to/from externally coupled systems, such as an external C4I system 217. The UAVs 102, 104, can include one or more payload elements 218, 220 which perform tasks for the UAV 102, 104, such as a video camera for capturing video.

The communication enhancement module 112, 114, 118 of each UAV/MUCS 102, 104, 108 is disposed in the communication path between the one or more data terminals 202, 204, 206 and the main processing module 208, 210, 212 of that UAV/MUCS 102, 104, 108. Thus, the communication enhancement module 112, 114, 118 is coupled to the one or more data terminals 202, 204, 206 and to the main processing module 208, 210, 212 of its UAV MUCS 102, 104, 108. If a UAV/MUCS 102, 104, 108 has multiple data terminals 202, 204, 206, the communication enhancement module 112, 114, 118 of the UAV/MUCS 102, 104, 108 can be coupled to each of the multiple data terminals 202, 204, 206 to provide the communication enhancements for all the corresponding communication links, or the communication enhancement module 112, 114, 118 can be coupled to a subset of the multiple data terminals 202, 204, 206.

In the outbound direction, each main processing module 208, 210, 212 generates STANAG 4586 messages for sending to a UAV/MUCS 102, 104, 108. The main processing modules 208, 210, 212 can generate the STANAG 4586 messages in accordance with STANAG 4586 based on any suitable information. For example, the main processing module 208 in the MUCS 108 can receive inputs from the I/O device 214, wherein the inputs correspond to commands for the first UAV 102. The main processing module 208 can receive the inputs from the I/O device 214 and generate STANAG 4586 messages corresponding to the commands for the first UAV 102. As another example, the main processing module 210 in the first UAV 102, can receive information from the payload element 218 and generate STANAG 4586 messages corresponding to the information, to transmit the information to the MUCS 108. Similarly, the main processing module 212 in the second UAV 104, can receive information from the payload element 220 and generate STANAG 4586 messages corresponding to the information, to transmit the information to the MUCS 108.

In the inbound direction, each main processing module 208, 210, 212 can receive STANAG 4586 messages and take appropriate action in response to the STANAG 4586 message. For example, the main processing module 208 in MUCS 108 can receive a STANAG 4586 message from the first UAV 102, wherein the STANAG 4586 message contains information that was obtained by the payload element 218 of the first UAV 102. The main processing module 208 of the MUCS 108 can receive this STANAG 4586 message, decode the message, and provide information to the I/O device 214 for the I/O device 214 to provide as output to a user. The main processing module 210 in the first UAV 102 can receive a STANAG 4586 message from the MUCS 108, wherein the STANAG 4586 message contains a command for an action to be taken by the payload element 218. The main processing module 210 of the first UAV 102 can receive this STANAG 4586 message, decode the message, and command the payload element 218 in accordance with the STANAG 4586 message.

Each communication enhancement module 112, 114, 118 can be coupled between the main processing module 210, 212, 208 and the data terminal 202, 204, 206 of its UAV/MUCS 102, 104, 108. The communication enhancement module 112, 114, 118 can interact with the main processing module 210, 212, 208 of its UAV/MUCS 102, 104, 108 to provide the communication enhancements for the device 102, 104, 108. In particular, the communication enhancement modules 118, 112, 114 on each end of a wireless link 110, 111 cooperate to intercept STANAG 4586 messages to-be-sent over the wireless link 110, 111 and adapt the messages to provide the enhanced communication features. The adapted messages are then received by the communication enhancement modules 118, 112, 114 on the other end of the wireless link 110, 111, which undo the adaptations to re-generate the STANAG 4586 message that was originally to-be-sent. The communication enhancement modules 118, 112, 114 then pass the re-generated STANAG 4586 message on their corresponding main processing unit 208, 210, 212.

Because the communication enhancement modules 118, 112, 114 are coupled between the main processing module 208, 210, 212 and their corresponding data terminal 206, 202, 204, the communication enhancement modules 118, 112, 114 can intercept the STANAG 4586 messages before they are sent over the communication link 110, 111. Thus, the communication enhancement modules 118, 112, 114 can adapt outgoing STANAG 4586 messages before they are sent. Additionally, this location allows the communication enhancement modules 118, 112, 114 to receive the adapted messages before they are passed to the main processing module 210, 212, 214. Thus, the communication enhancement modules 118, 112, 114 can undo the adaptations for incoming adapted messages before the messages are passed to the main processing module 208, 210, 212. Accordingly, the position in which the communication enhancement modules 112, 114, 118 are coupled enables the adaptations to the STANAG 4586 messages to be transparent to the main processing modules 208, 210, 212.

Additionally, by interacting with the main processing modules 208, 210, 212 using STANAG 4586 messages, the communication enhancement modules 118, 112, 114 can be added to any MUCS 108 or UAV 102, 104, 106 that can send and receive STANAG 4586 messages. Moreover, the components of the MUCS 108 or UAV 102, 104, 106 to which the communication enhancement module 118, 112, 114 is added do not require significant changes for the communication enhancements. Instead, the main processing unit 208, 210, 212 of the MUCS 108 or UAV 102, 104, 106 can input and output STANAG 4586 messages in the normal manner, merely adjusting where the STANAG 4586 messages are passed to and received from. Instead of passing messages to the data terminal 202, 204, 206, the main processing unit 210, 212, 214 passes information to the communication enhancement module 118, 112, 114, which then adapts and passes messages to the data terminal 202, 204, 206 as described above. Additionally, instead of receiving messages at the main processing unit 208, 210, 212 from the data terminal 202, 204, 206, the messages received at the data terminal 202, 204, 206 are passed to the communication enhancement module 112, 114, 118 before being un-adapted and passed to the main processing module 208, 210, 212 as discussed above. Accordingly, the communication enhancement modules 112, 114, 118 can easily be added to new or existing STANAG 4586 compliant MUCS 108 or UAVs 102, 104, 106.

Figure 3:
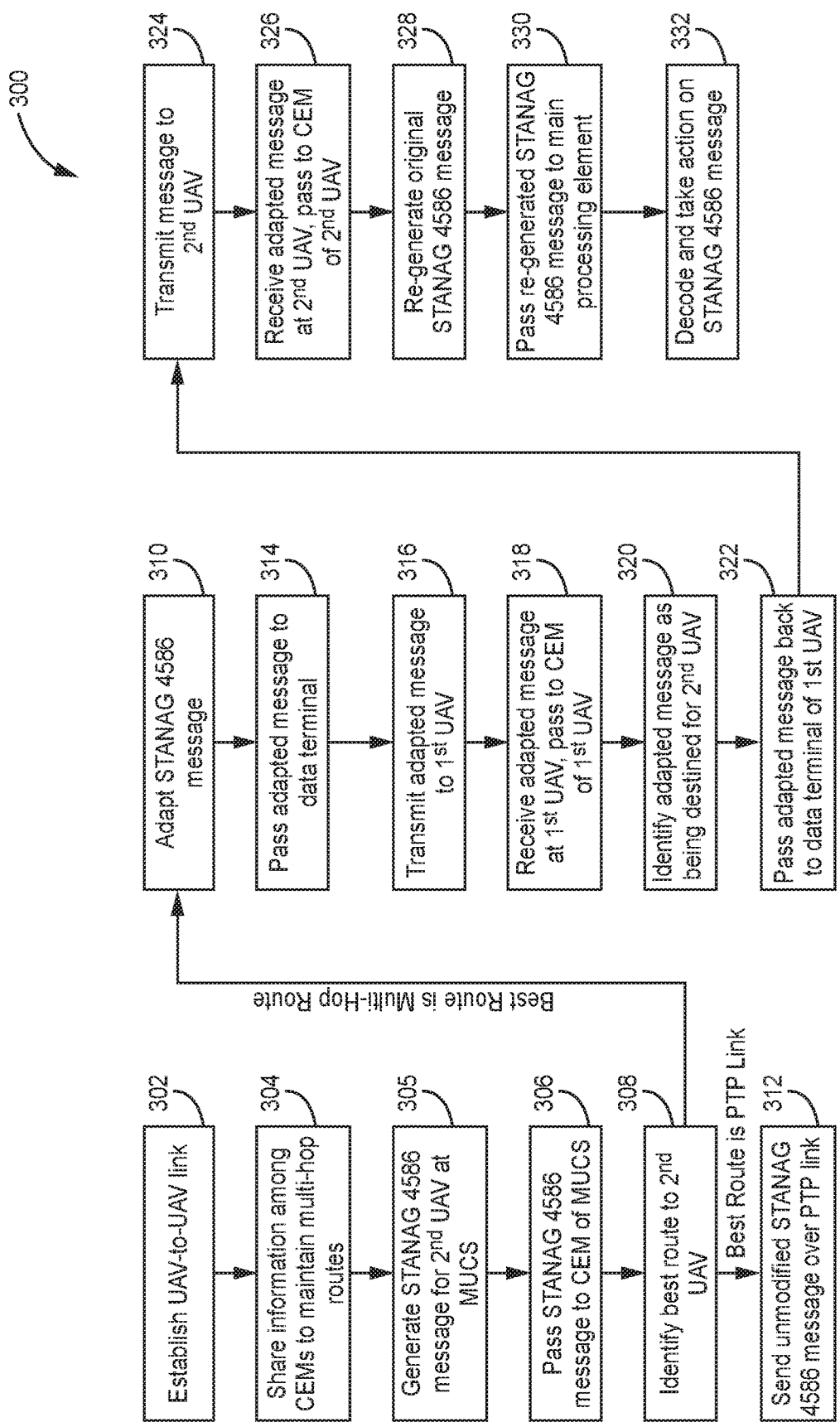
FIG. 3 is a flow diagram of an example method of enhancing communication for a plurality of UAVs using the communication enhancement modules of FIG. 2.

FIG. 3 is flow diagram of an example method 300 of enhancing communication with the communication enhancement modules 112, 114, 116, 118. One means of enhancing communication of a MUCS 108 and UAVs 102, 104, 106 is to enable messages to be sent over a multi-hop route between the MUCS 108 and a first UAV 102, 104, 106, via another UAV 102, 104, 106. STANAG 4586 does not support UAV-to-UAV wireless links. Thus, UAVs 102, 104, 106 and MUCS 108 using STANAG 4586 are restricted to communicating with each other over their respective UAV-to-MUCS link. If the bandwidth of that UAV-to-MUCS link becomes degraded, communication between the MUCS 108 and UAV 102, 104, 106 suffers.

The communication enhancement modules (CEMs) 112, 114, 116, 118, however, cooperate with one another to implement one or more UAV-to-UAV wireless links 111 among the UAVs 102, 104, 106 (block 302). To establish a UAV-to-UAV wireless link 111, the communication enhancement modules 112, 114, 116, 118 direct their corresponding data terminals 202, 204, 206 to send and receive messages in the frequency ranges of the data terminals 202, 204, 206 in other UAVs 102, 104, 106. The messages sent and received by the data terminals 202, 204, 206 can be used to discover other communication enhancement modules 112, 114, 116, 118 and to establish UAV-to-UAV links 111.

As an example, with reference to FIG. 2, the communication enhancement module 112 of the first UAV 102 can direct the data terminal 202 of the first UAV 102 to send a message (e.g., a discovery message) to the second UAV 104 (or any UAV within range) to establish a UAV-to-UAV wireless link 111. The message to establish a UAV-to-UAV link 111 can be addressed to a specific UAV (e.g. the second UAV 104) that is likely to be within range of the first UAV 102, or can be a generic broadcast message that is directed to any UAV that is within range. In an example, such a generic broadcast message can include information restricting the UAVs to which the message is directed, to the set of UAVs under control of the same MUCS 108 that is controlling the first UAV 102. That is, the message to establish a UAV-to-UAV link 111 can be directed to any UAV that is being controlled by the MUCS 108 that is controlling the UAV sending the message. Thus, if other UAVs controlled by different MUCS are operating within communication range of the first UAV 102, UAV-to-UAV links 111 will not be established with those other UAVs.

The data terminal 204 of the second UAV 104 can receive the message and pass the message to the communication enhancement module 114 of the second UAV 104. The communication enhancement module 114 can then reply back to the first UAV 102 with an appropriate message to establish the wireless link 111. Notably, since the UAV-to-UAV link 111 is established between the communication enhancement modules 112, 114, control messages related to establishing and maintaining the link 111 originate from and terminate at the communication enhancement modules 112, 114. The main processing modules 210, 212 do not need to support, or even know about, the UAV-to-UAV link 111. Accordingly, the control messages can conform to a communication protocol that is specific to the communication enhancement modules 112, 114, 118 and has been adopted thereby.

The UAVs 102, 104, 106 can also establish UAV-to-MUCS links 110 with the MUCS 108 in a manner in compliance with STANAG 4586. The UAV-to-MUCS links 110 formed between the MUCS 108 and the UAVs 102, 104, 106 along with the UAV-to-UAV links 111 formed amongst the UAVs 102, 104, 106 form a network among the UAVs 102, 104, 106, and MUCS 108.

The communication enhancement modules 112, 114, 118 share information with each other to identify and maintain multi-hop routes through the network of UAVs 102, 104, and MUCS 108 (block 304). The communication enhancement modules 112, 114, 118 can use these multi-hop routes to bypass a non-existent or bandwidth degraded UAV-to-MUCS link. For example, in the situation shown in FIG. 2, no UAV-to-MUCS link is present between the second UAV 104 and the MUCS 108 due to, for example, weather, geography, and/or enemy jamming. The second UAV 104 and the first UAV 102, however, have established a UAV-to-UAV link 111 therebetween. The first UAV 102 and MUCS 108 have also established a UAV-to-MUCS link 110 therebetween. Through sharing of information, the communication enhancement modules 112, 114, 118 form a multi-hop route between the MUCS 108 and the second UAV 104 via the UAV-to-MUCS link 110 between the MUCS 108 and the first UAV 102, and the UAV-to-UAV link 111 between the first UAV 102 and the second UAV 104. The communication enhancement modules 112, 114, 118 can use this multi-hop route to pass STANAG 4586 messages between the MUCS 108 and the second UAV 104, if a UAV-to-MUCS link between the second UAV 104 and the MUCS 108 is degraded or is not possible as shown in FIG. 2. The information shared, can be shared and stored by the communication enhancement modules 112, 114, 118 in any appropriate form, such as in a routing table.

To enable a STANAG 4586 message to be sent over a multi-hop route, which is not supported by STANAG 4586, the communication enhancement modules 112, 114, 118 adapt the STANAG 4586 message before the message is sent, send the adapted message over the multi-hop route, and then undo the adaption upon receipt of the adapted message at the destination. For example, for a STANAG 4586 message being sent from the MUCS 108 to the second UAV 104, the main processing module 208 of the MUCS 108 can generate the STANAG 4586 message and include the second UAV 104 as the destination in the STANAG 4586 message (block 305). The main processing module 208 can then pass the STANAG 4586 message to the communication enhancement module 118 (block 306). The communication enhancement module 118 can reference a routing table to identify the best route to the second UAV 104 (block 308). In the situation shown in FIG. 2, the best route to the second UAV 104 is over a multi-hop route through the first UAV 102. Since this multi-hop route is not supported by STANAG 4586, the communication enhancement module 118 adapts the STANAG 4586 message for sending over the multi-hop route (block 310).

If a UAV-to-MUCS link with the second UAV 104 were available, and the UAV-to-MUCS link had sufficient bandwidth, the communication enhancement module 118 may determine that the best route is the UAV-to-MUCS link to the second UAV 104. In such a situation, the communication enhancement module 118 can pass the STANAG 4586 message on to the data terminal 206 without adaption (block 312). That is, the STANAG 4586 message generated by the main processing module 208 can be passed on in an unmodified form to the data terminal 206. The data terminal 206 can then transmit the STANAG 4586 message over the UAV-to-MUCS link where it is received by the second UAV 104.

In examples where the STANAG 4586 message is adapted for transmission over the multi-hop route, adapting the STANAG 4586 message can include creating a tunneled message from the STANAG 4586 message. The tunneled message can have any appropriate form. In an example, the tunneled message is a form that requires low-overhead, such as the low-overhead routing method described in U.S. patent application Ser. No. 15/425,364, entitled "Low-Overhead Routing", which is hereby incorporated herein by reference.

In any case, the STANAG 4586 message is adapted to a form corresponding to a message protocol to which the communication enhancement modules 112, 114, 116, 118 have adopted, such that the communication enhancement module 114 at the first UAV 102 receives the adapted message and identifies that the message is to-be-routed to the second UAV 104. Notably, the adapted message (and more broadly the message protocol adopted by the communication enhancement modules 112, 114) does not need to conform to the STANAG 4586 standard, as the adapted message is being sent to, and received by, other communication enhancement modules 112, 114, 118, not by the main processing modules 208, 210, 212. After adapting the STANAG 4586 message, the communication enhancement module 118 passes the adapted message on to the data terminal 206 (block 314). The data terminal 206 transmits the adapted message over the UAV-to-MUCS link 110 to the first UAV 102 (block 316).

The data terminal 202 at the first UAV 102 receives the adapted message and passes the adapted message to the communication enhancement module 112 of the first UAV 102 (block 318). The communication enhancement module 112 of the first UAV 102 identifies that the adapted message is destined for the second UAV 104 (block 320). In response to identifying that the destination of the message is the second UAV 104, the communication enhancement module 112 of the first UAV 102 passes the adapted message back to the data terminal 202 for transmission over wireless link 111 to the second UAV 104 (block 322). The adapted message passed back to the data terminal 202 by the communication enhancement module 112 of the first UAV 102 can be identical to the adapted message received from the MUCS 108, or can be a modified version thereof. In any case, however, the adapted message is in a form corresponding to the message protocol that the communication enhancement modules 112, 114, 116, 118 have adopted. The adapted message from the communication enhancement module 112 is then transmitted by the data terminal 202 of the first UAV 102 over the UAV-to-UAV link 111 (block 324).

The data terminal 204 of the second UAV 104 receives the adapted message and passes the adapted message to the communication enhancement module 114 of the second UAV 104 (block 326). This communication enhancement module 114 identifies that the adapted message is destined for the second UAV 104 and undoes the adaptations made by the communication enhancement module 118 in the MUCS 108 as well as any adaptations made by the communication enhancement module 112 in the first UAV 102 (block 328). By undoing the adaptations, the communication enhancement module 114 of the second UAV 104 re-generates the STANAG 4586 message originally generated by the main processing module 208 of the MUCS 108. The re-generated STANAG 4586 message is passed from the communication enhancement module 114 to the main processing module 212 of the second UAV 104 (block 330). The main processing module 212 of the second UAV 104 can then decode the STANAG 4586 message in accordance with STANAG 4586 (block 332) as if the STANAG 4586 message had been sent over a UAV-to-MUCS link between the MUCS 108 and the second UAV 104 in accordance with STANAG 4586.

The message protocol adopted by the communication enhancement modules 112, 114, 116, 118 allows a communication enhancement module 112, 114, 116, 118 receiving an adapted message to undo the adaptations and re-generate the original STANAG 4586 message. That is, a communication enhancement module 112, 114, 116, 118 receiving an adapted message can determine what the original STANAG 4586 message was from the adapted message based on the message protocol adopted by the communication enhancement modules 112, 114, 116, 118. Any suitable scheme of indicating the original message in an adapted (e.g., tunneled message) can be used.

Advantageously, the adapted message can be sent, received, and routed on by the MUCS 108, the first UAV 102, and the second UAV 104 without requiring interaction with their main processing modules 208, 210, 212. Thus, the main processing modules 208, 210, 212 do not need extensive adaptation to enable the multi-hop route. Instead, the added communication enhancement modules 112, 114, 118 interact with the main processing modules 208, 210, 212 using their already included STANAG 4586 interface.

Messages sent from the second UAV 104 to the MUCS 108 can similarly be routed through the first UAV 102 over the multi-hop route by the communication enhancement modules 112, 114, 118. In this direction, the main processing module 212 generates a STANAG 4586 message for transmission over a point-to-point link to the MUCS 108. The main processing module 212 passes the STANAG 4586 message to the communication enhancement module 114, which identifies that the best route to the MUCS 108 is via the multi-hop route through the first UAV 102. The communication enhancement module 114 then adapts the STANAG message and passes the adapted message to the data terminal 204 for transmission over the UAV-to-UAV link 111 to the first UAV 102.

The data terminal 202 of the first UAV 102 receives the adapted message and passes the adapted message to the communication enhancement module 112 of the first UAV 102. The communication enhancement module 112 of the first UAV 102 identifies the MUCS 108 as the destination of the adapted message and passes the adapted message back to the data terminal 202 for transmission over UAV-to-MUCS link 110 to the MUCS 108. The data terminal 206 of the MUCS 108 receives the adapted message and passes the adapted message to the communication enhancement module 118 of the MUCS 108. The communication enhancement module 118 of the MUCS 108 undoes the adaptations to the message to re-generate the STANAG 4586 message originally generated by the main processing module 212 of the second UAV 104. The re-generated STANAG 4586 message is then passed to the main processing module 208 of the MUCS 108 to be processed in the normal manner thereby.

Although the multi-hop route in the example described above includes a single UAV (the first UAV 102) between the source of a STANAG 4586 message (e.g., the MUCS 108) and the destination of the STANAG 4586 message (e.g., the second UAV 104), any number of UAVs can be disposed between the source and the destination if those UAVs have respective communication enhancement modules that have established UAV-to-UAV links as described herein. Accordingly, the multi-hop route can have more than one hop (UAV) between the source and the destination.

In an example, the communication enhancement modules 112, 114, 116, 118 can generate and pass synthetic STANAG 4586 compliant Data Link messages to their corresponding main processing module 210, 212, 208 to fool the main processing module 210, 212, 208 into thinking there is a STANAG 4586 compliant data link established with a UAV/MUCS 102, 104, 106, 108. It may be necessary to fool the main processing module 210, 212, 218, because if the main processing module 210, 212, 208 does not think there is a STANAG 4586 compliant data link available to a UAV/MUCS 102, 104, 106, 108, that main processing module 210, 212, 208 may not send any STANAG 4586 messages to the UAV/MUCS 102, 104, 106, 108. Thus, in order to utilize the multi-hop route created by the communication enhancement modules 112, 114, 116, 118, it may be necessary to fool the main processing module 210, 212, 218 into believing there is a STANAG 4586 compliant data link with the UAV/MUCS 102, 104, 106, 108, so that the main processing module 210, 212, 208 sends and receives STANAG 4586 messages to/from that UAV/MUCS 102, 104, 106, 108.

To fool the main processing modules 210, 212, 208, the communication enhancement module 112, 114, 116, 118 coupled to the main processing module 210, 212, 208 can generate synthetic STANAG 4586 messages to indicate to the main processing module 210, 212, 208 that a STANAG 4586 compliant UAV-to-MUCS link is available. For example, in the situation shown in FIG. 2, the communication enhancement module 118 can generate the necessary STANAG 4586 messages to fool the main processing module 208 of the MUCS 108 into believing it is establishing a STANAG 4586 compliant data link between the MUCS 108 and the second UAV 104. The STANAG 4586 messages generated by the communication enhancement module 118 can be generated as if the messages were being generated and sent by the second UAV 104. The STANAG 4586 messages can then be passed by the communication enhancement module 118 to the main processing module 208 of the MUCS 108 in sequence as necessary to fool the main processing module 208 into believing it is establishing a data link with the second UAV 104. The communication enhancement module 114 can likewise generate synthetic STANAG 4586 data link messages (as if the messages were from the MUCS 108) and pass them to the main processing module 212 of the second UAV 104 to fool that main processing module 212 into believing it is establishing a data link with the MUCS 108. Once this process is completed on both the second UAV 104 and the MUCS 108, their respective main processing modules 212, 208 will believe there is a STANAG 4586 compliant data link established therebetween, when in fact no such data link is present. The communication enhancement modules 114, 118 can also generate the necessary STANAG 4586 data link messages thereafter to maintain that belief of the STANAG 4586 data link.

Alternatively, some or all of the synthetic messages can be generated by the communication enhancement module 112, 114, 116, 118 on the opposite end of the faked data link. That is, the synthetic STANAG 4586 messages for the main processing module 118 of the MUCS 108 can be generated by the communication enhancement module 114 of the second UAV 104 and sent over the multi-hop link from the second UAV 104 to the MUCS 108. Similarly, the synthetic STANAG 4586 message for the main processing module 212 of the second UAV 104 can be generated by the communication enhancement module 118 of the MUCS 108 and sent from the MUCS 108 over the multi-hop route to the second UAV 104.

In any case, the synthetic STANAG 4586 data link messages can include any STANAG 4586 message for establishing, maintaining, or ending a STANAG 4586 compliant data link. Example STANAG 4586 data link messages include Data Link Discovery Messages, Data Link Command Messages, Data Link Status Messages, and Data Link Transition Messages as described in the STANAG 4586 standard.

In an example, the communication enhancement modules 112, 114, 118 can modify a real STANAG 4586 Data Link Status message to fool a main processing module 210, 212, 208 into believing the parameters of an established data link are different than the parameters actually are. For example, the communication enhancement module 118 of the MUCS 108 can modify a STANAG 4586 Data Link Status message from the second UAV 104 so that the modified STANAG 4586 Data Link Status message reflects a parameter(s) of a multi-hop route to the second UAV 104, instead of a parameter of a UAV-to-MUCS link between the second UAV 104 and the MUCS 108 (in a situation where a UAV-to-MUCS link is present between the second UAV 104 and the MUCS 108). Fooling the main processing module 210 in this way may be beneficial to get the main processing module 210 to utilize the multi-hop route efficiently. Similar modifications can be made for STANAG 4586 Data Link Status messages sent from the MUCS 108 to the second UAV 104.

Other STANAG 4586 messages can be synthetically generated or modified in a similar manner by the communication enhancement modules 112, 114, 116, 118 for other purposes.

The communication enhancement modules 112, 114, 116, 118 can also enable UAV-to-UAV communications. That is, two UAVs 102, 104, 106 having cooperating communication enhancement modules therein can communicate with each other. Messages sent between two or more UAVs can take any suitable format, and the communication enhancement modules 112, 114, 116, 118 can modify such a message, and route the message to the destination UAV(s) 102, 104, 106 via the available communication links 110, 111. UAV-to-UAV messages could include messages to coordinate flight paths, such as to avoid overlapping coverage areas, cover a wider area, or to converge on an area for a joint task. Other UAV-to-UAV messages could also be used.

Since conventional STANAG 4586 messages do not support UAV-to-UAV communications, a UAV 102, 104, 106 may have to be modified to include additional application layer software to enable UAV-to-UAV communications. In an example, however, the communication enhancement modules 112, 114, 116, 118 can enable a first UAV 102 that includes application layer software to support UAV-to-UAV communications to send control messages to a second UAV 104 which does not include such application layer software. To control such a second UAV 104, the main processing module 210 of the first UAV 102 can generate a control message instructing the second UAV 104 to take some action. Since STANAG 4586 does not support UAV-to-UAV messages, the control message can take any suitable format, including a format similar to a proper STANAG 4586 message. The main processing module 210 of the first UAV 102 sends the control message to the communication enhancement module 202 of the first UAV 102. The communication enhancement module 202 can modify the message if necessary to get the message into a form that will be understood by the other communication enhancement modules 204, 206, 208. If the message is already in a form that will be understood by the other communication enhancement modules 204, 206, 208, the communication enhancement module 102 may not modify the message. In either case, the communication enhancement module 202 can send the message to the data terminal 202 of the first UAV 102 for transmission over one or more communication links 110, 111 to the second UAV 104.

The message can be routed by the communication enhancement modules 112, 114, 116, 118 as desired to arrive at the second UAV 104. The message can be received by the data terminal 204 of the second UAV 104 and passed to the communication enhancement module 114 thereof. The communication enhancement module 114 can modify the message, if necessary, so that the message has the format of a STANAG 4586 control message sent from the MUCS 108. If the message already has a format of a STANAG 4586 control message from the MUCS 108, the communication enhancement module 114 need not modify the message. The communication enhancement module 114 can then send the STANAG 4586 message to the main processing module 114 of the second UAV 104. Since the message appears as a STANAG 4586 message from the MUCS 108, the main processing module 114 will decode the message and act on the message as it would if the message were actually send by the MUCS 108. The control message can include any suitable payload, including an instruction to update a route, waypoint, or the like for the second UAV 104. In this way, a first UAV 102 having the capability of UAV-to-UAV communication can control a second UAV 104 that lacks such a capability.

The communication enhancement modules 112, 114, 116, 118 can also provide other communication enhancements, including adjusting which links or routes a traffic flow is sent over based on available bandwidth of the links or routes, adjust a traffic flows bandwidth requirements by applying QoS techniques such as header compression and filtering, pre-empting lower priority flows to allow a higher-priority flow to utilize a link or route, coordinating among the UAVs that are sharing a link so that lower-priority flows will stop their transmissions to allow higher priority flows from other UAVs to use the link. Notably, these communication enhancements can be performed for STANAG 4586 messages in a manner transparent to the UAVs/MUCS 102, 104, 106, 108 by modifying a STANAG 4586 message before transmission and undoing the modifications at the destination as described herein.

As mentioned above, each communication enhancement module 112, 114, 116, 118 can be a software-tool that is loaded onto a MUCS 108 or UAV 102, 104, 106, or the communication enhancement module 112, 114, 116, 118 can be a hardware appliance with appropriate software that is installed in a MUCS 108 or UAV 102, 104, 106. In any case the communication enhancement module 112, 114, 116, 118 can be coupled or otherwise linked to the main processing module 210, 212, 208 and the data terminal 202, 204, 206 in its MUCS 108 or UAV 102, 104, 106.

Figure 4:
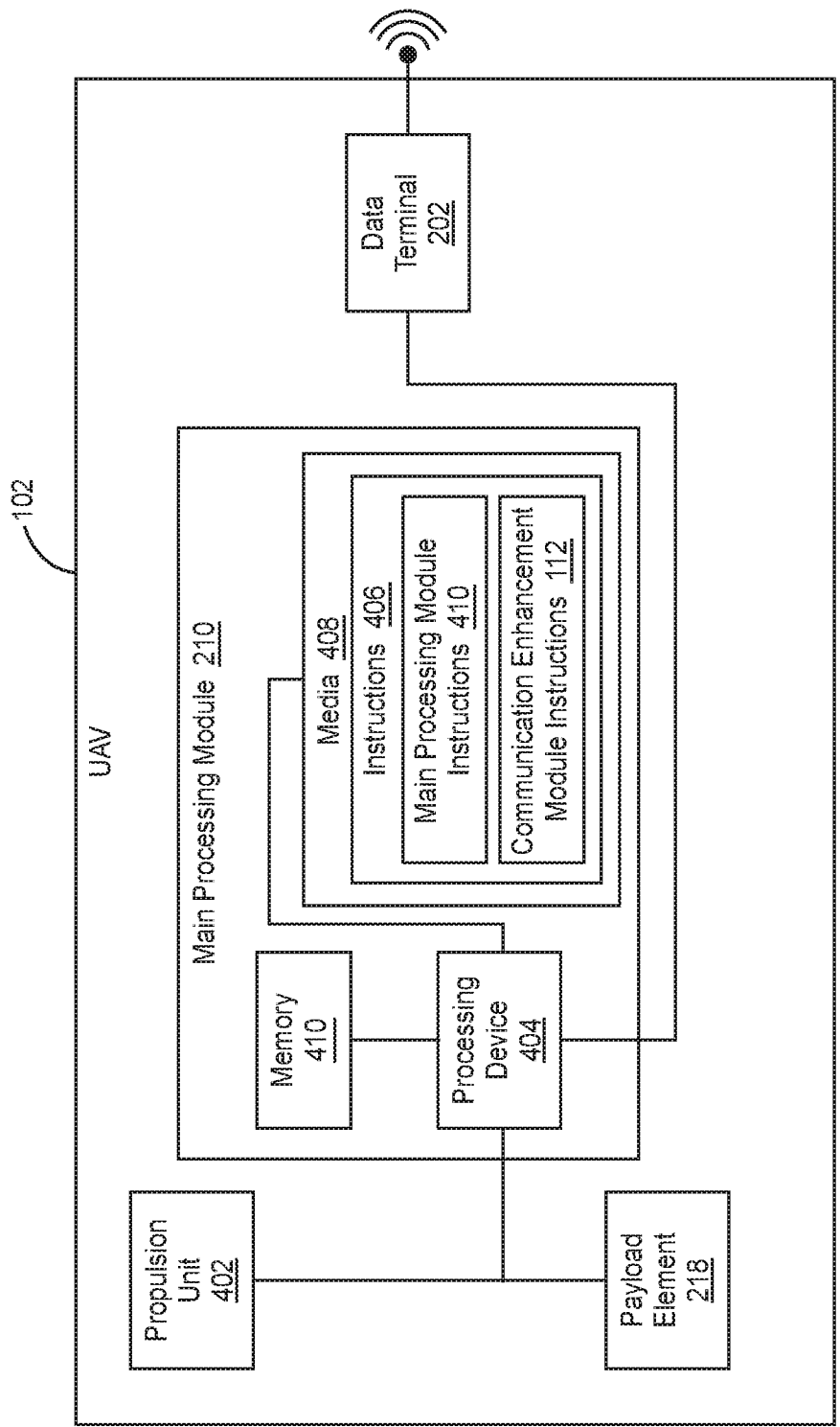
FIG. 4 is a block diagram of an example UAV having a software tool communication enhancement module therein.

FIG. 4 is a block diagram of an example UAV 102 that includes a communication enhancement module 112 that is a software tool. The UAV 102 includes a propulsion unit 402 to propel the UAV 102. Any appropriate propulsion unit 402 can be used including one or more electric motors or fuel engines and propellers, jet engines, and/or ducted fan.

The UAV 102 also includes a main processing module 210 that performs the general processing for the UAV 102. The main processing module 210 includes one or more processing devices 404 for executing instructions 406. The one or more processing devices 404 can include a general-purpose processor or a special purpose processor. The instructions 406 are stored (or otherwise embodied) on or in an appropriate storage medium or media 408 (such as flash or other non-volatile memory) from which the instructions 406 are readable by the processing device(s) 404 for execution thereby. The main processing module 210 also includes memory 410 that is coupled to the processing device(s) 404 for storing instructions (and related data) during execution by the processing device(s) 404. Memory 410 comprises, in one implementation, any suitable form of random access memory (RAM) now known or later developed, such as dynamic random-access memory (DRAM). In other implementations, other types of memory are used.

The instructions 406 include the main processing module instructions 410 which, when executed by the one or more processing devices 404, cause the one or more processing devices 404 to perform the actions of the main processing module 210 described herein. The instructions 406 also include the communication enhancement module 112 software tool loaded thereon. The communication enhancement module 112 includes instructions which, when executed by the one or more processing devices 404, cause the one or more processing devices 404 to perform the actions of the communication enhancement module 112 described herein. The instructions 406 also direct information to be passed between the communication enhancement module 112 and the main processing module 410 as described herein.

In an example, the communication enhancement module 112 or a portion thereof can be stored or otherwise embodied on a computer readable medium that is distinct from the UAV 102 and can be loaded onto the main processing module 210 to implement the communication enhancement module 112 thereon. The computer readable media on which the communication enhancement module 112 are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

The main processing module 210 is coupled to the propulsion unit 402 to provide commands thereto and receive information from sensors thereof. The main processing module 210 is also coupled to a data terminal 202, which includes one or more wireless transceivers for transmitting and receiving wireless signals with a MUCS 108 and one or more UAVs 104, 106 as described herein. The UAV 102 can also include one or more payload elements 218 coupled to the main processing module 210 as described herein.

FIG. 5 is a block diagram of another example UAV 104 that includes a communication enhancement module 114 that is a hardware with software appliance, installed in the UAV 104. Similar to UAV 102 of FIG. 4, the UAV 104 includes a propulsion unit 502 to propel the UAV 104. Any appropriate propulsion unit 502 can be used including one or more electric motors or fuel engines and propellers, jet engines, and/or ducted fan.

The UAV 104 also includes a main processing module 212 that performs the general processing for the UAV 104. The main processing module 212 includes one or more processing devices 504 for executing instructions 506. The one or more processing devices 504 can include a general-purpose processor or a special purpose processor. The instructions 506 are stored (or otherwise embodied) on or in an appropriate storage medium or media 508 (such as flash or other non-volatile memory) from which the instructions 506 are readable by the processing device(s) 504 for execution thereby. The instructions 506 include the main processing module instructions 510 which, when executed by the one or more processing devices 504, cause the one or more processing devices 504 to perform the actions of the main processing module 212 described herein. The main processing module 212 also includes memory 509 that is coupled to the processing device(s) 504 for storing instructions (and related data) during execution by the processing device(s) 504. Memory 509 comprises, in one implementation, any suitable form of random access memory (RAM) now known or later developed, such as dynamic random-access memory (DRAM). In other implementations, other types of memory are used.

The main processing module 212 is coupled to the propulsion unit 502 to provide commands thereto and receive information from sensors thereof. The main processing module 212 is also coupled to the communication enhancement module 114, which is an appliance installed in the UAV 104. The communication enhancement module 114 includes one or more processing units 511, which are distinct from the one or more processing devices 504 of the main processing module. The one or more processing devices 511 can include a general-purpose processor or a special purpose processor. The communication enhancement module 114 also includes instructions 512, which are stored (or otherwise embodied) on or in an appropriate storage medium or media 514 (such as flash or other non-volatile memory) from which the instructions 512 are readable by the processing device(s) 510 for execution thereby. The instructions 512 include the instructions which, when executed by the one or more processing devices 511, cause the one or more processing devices 511 to perform the actions of the communication enhancement module 114 described herein. The communication enhancement module 114 also includes memory 516 that is coupled to the processing device(s) 511 for storing instructions (and related data) during execution by the processing device(s) 511. Memory 516 comprises, in one implementation, any suitable form of random access memory (RAM) now known or later developed, such as dynamic random-access memory (DRAM). In other implementations, other types of memory are used.

The communication enhancement module 114 is coupled to the data terminal 204, which includes one or more wireless transceivers for transmitting and receiving wireless signals with a MUCS 108 and one or more UAVs 102, 106 as described herein. The UAV 104 can also include one or more payload elements 220 coupled to the main processing module 212 as described herein.

Although the example UAVs 102, 104 shown in FIGS. 4, 5 include a software tool and a hardware-with-software appliance respectively, these are merely examples. The communication enhancement module 112, 114, 116, 118 of the UAVs 102, 104, 106 or MUCS 108 can be either a software tool or a hardware with software appliance.

What is claimed is:

1. A communication enhancement module for operating along with a plurality of cooperating communication enhancement modules, the communication enhancement module comprising:
   a computer readable medium having instructions thereon, the instructions, when executed by one or more processing devices, cause the one or more processing devices to:
   receive a STANAG 4586 message from an upstream module;
   determine whether a point-to-point wireless connection is available to the destination of the STANAG 4586 message;
   if a point-to-point wireless connection is available, send a message based on the STANAG 4586 message over the point-to-point wireless connection to the destination;
   if a point-to-point wireless connection is not available:
   identify a multi-hop path to the destination via at least one other communication enhancement module;
   modify the STANAG 4586 message to create a modified message having a format corresponding to the communication enhancement modules; and
   send the modified message to a next hop communication enhancement module on the multi-hop path for directing toward the destination.

2. The communication enhancement module of claim 1, wherein modify the STANAG 4586 message includes create a tunneled message.

3. The communication enhancement module of claim 1, wherein send a message based on the STANAG 4586 message over the point-to-point wireless connection includes send the STANAG 4586 message in an unmodified form over the point-to-point wireless connection.

4. The communication enhancement module of claim 1, wherein the upstream module is one of a vehicle specific module for an unmanned aerial vehicle (UAV) or a UAV control system.

5. The communication enhancement module of claim 1, wherein, send a message based on the STANAG 4586 message over the point-to-point wireless connection includes send a message to a data terminal, which wirelessly transmits the message to a data terminal of the destination, wherein, send the modified message to a next hop communication enhancement module includes send the modified message to a data terminal, which transmits the modified message to a data terminal of the next hop communication enhancement module.

6. The communication enhancement module of claim 1, wherein the instructions cause the one or more processing devices to:
   send information regarding network flows sent and/or received by the communication enhancement module on a wireless link;
   receive information regarding network flows of a third communication enhancement module on the wireless link; and
   adjust a flow rate of a network flow from the communication enhancement module over the wireless link based on the information received regarding network flows of the third communication enhancement module to allow a higher-priority flow from the third communication enhancement module to use more bandwidth of the wireless link.

7. The communication enhancement module of claim 1, wherein determine whether a point-to-point wireless connection is available to the destination of the STANAG 4586 message includes:
   determine whether a wireless link corresponding to the point-to-point wireless connection is degraded below a threshold;
   and
   if it is determined that the wireless link is degraded below a threshold, it is determined that the point-to-point wireless connection is not available.

8. A method for enhancing communication for one or more unmanned aerial vehicles (UAVs), the method comprising:
   receiving, at a first communication enhancement module of a first UAV of the one or more UAVs, a STANAG 4586 message from an upstream module in the first UAV;
   determining whether a point-to-point wireless connection is available to a UAV control system to which the STANAG 4586 message is destined;
   if a point-to-point wireless connection is available, sending a message based on the STANAG 4586 message over the point-to-point wireless connection to the UAV control system;
   if a point-to-point wireless connection is not available:
   identifying a multi-hop path to the destination via at least one other communication enhancement modules of at least one other UAV;
   modifying the STANAG 4586 message to create a modified message having a format corresponding to the communication enhancement modules; and
   sending the modified message to a next hop communication enhancement module of another UAV on the multi-hop path for directing toward the UAV control system.

9. The method of claim 8, wherein modifying the STANAG 4586 message includes creating a tunneled message.

10. The method of claim 8, wherein sending a message based on the STANAG 4586 message over the point-to-point wireless connection includes sending the STANAG 4586 message in an unmodified form over the point-to-point wireless connection.

11. The method of claim 8, wherein the upstream module is a vehicle specific module for the first UAV.

12. The method of claim 8, wherein, sending a message based on the STANAG 4586 message over the point-to-point wireless connection includes sending a message to a data terminal of the first UAV, which wirelessly transmits the message to a data terminal of the UAV control system,
wherein, sending the modified message to a next hop communication enhancement module includes sending the modified message to the data terminal of the first UAV, which transmits the modified message to a data terminal of the next hop communication enhancement module of another UAV.

13. The method of claim 8, comprising:
sending information regarding network flows sent and/or received by the communication enhancement module of the first UAV on a wireless link;
receiving information regarding network flows of a third communication enhancement module of a second UAV on the wireless link; and
adjusting a flow rate of a network flow from the communication enhancement module over the wireless link based on information received regarding network flows of the third communication enhancement module to allow a higher-priority flow from the third communication enhancement module to use more bandwidth of the wireless link.

14. The method of claim 8, wherein determining whether a point-to-point wireless connection is available to the destination of the STANAG 4586 message includes:
determining whether a wireless link corresponding to the point-to-point wireless connection is degraded below a threshold;
if it is determined that the wireless link is degraded below a threshold, it is determined that the point-to-point wireless connection is not available.

15. An unmanned aerial vehicle (UAV) comprising:
a propulsion system to propel the UAV in flight; and
a communication enhancement module, the communication enhancement module comprising:
one or more processing devices;
a computer readable medium coupled to the one or more processing devices, the computer readable medium having instructions thereon, the instructions, when executed by the one or more processing devices, cause the one or more processing devices to:
receive a STANAG 4586 message from an upstream module of the UAV;
determine whether a point-to-point wireless connection is available to the UAV control system for the UAV;
if a point-to-point wireless connection is available, send a message based on the STANAG 4586 message over the point-to-point wireless connection to the UAV control system;
if a point-to-point wireless connection is not available:
identify a multi-hop path to the destination via other communication enhancement modules of other UAVs;
modify the STANAG 4586 message to create a modified message having a format corresponding to the other communication enhancement modules; and
send the modified message to a next hop communication enhancement module of another UAV on the multi-hop path for directing toward the UAV control station.

16. The UAV of claim 15, wherein modify the STANAG 4586 message includes create a tunneled message.

17. The UAV of claim 15, wherein send a message based on the STANAG 4586 message over the point-to-point wireless connection includes send the STANAG 4586 message in an unmodified form over the point-to-point wireless connection.

18. The UAV of claim 15, wherein the upstream module is a vehicle specific module.

19. The UAV of claim 15, wherein the instructions cause the one or more processing devices to:
send information regarding network flows sent and/or received by the UAV on a wireless link;
receive information regarding network flows of a second UAV on the wireless link; and
adjust a flow rate of a network flow from the first UAV over the wireless link based on information received regarding network flows of the second UAV to allow a higher-priority flow from the second UAV to use more bandwidth of the wireless link.

20. The UAV of claim 15, wherein determine whether a point-to-point wireless connection is available to the destination of the STANAG 4586 message includes:
determine whether a wireless link corresponding to the point-to-point wireless connection is degraded below a threshold;
if it is determined that the wireless link is degraded below a threshold, it is determined that the point-to-point wireless connection is not available.

* * * * *